US011951677B2

(12) United States Patent
Arai et al.

(10) Patent No.: US 11,951,677 B2
(45) Date of Patent: Apr. 9, 2024

(54) THREE DIMENSIONAL MANUFACTURING APPARATUS AND METHOD FOR MANUFACTURING THREE DIMENSIONAL MANUFACTURED PRODUCT

(71) Applicant: CANON KABUSHIKI KAISHA, Tokyo (JP)

(72) Inventors: Takashi Arai, Newport News, VA (US); Yasuhiro Sekine, Yokohama (JP); Akio Kashiwazaki, Yokohama (JP); Toshiki Ito, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 177 days.

(21) Appl. No.: 17/242,698

(22) Filed: Apr. 28, 2021

(65) Prior Publication Data

US 2021/0245435 A1 Aug. 12, 2021

Related U.S. Application Data

(62) Division of application No. 15/677,160, filed on Aug. 15, 2017, now abandoned.

(30) Foreign Application Priority Data

Aug. 23, 2016 (JP) .................................. 2016-163070
Aug. 25, 2016 (JP) .................................. 2016-164835

(51) Int. Cl.
*B29C 64/124* (2017.01)
*B29C 64/188* (2017.01)
(Continued)

(52) U.S. Cl.
CPC .......... *B29C 64/124* (2017.08); *B29C 64/188* (2017.08); *B29C 64/255* (2017.08);
(Continued)

(58) Field of Classification Search
CPC ........................... B29C 64/264; B29C 64/188
See application file for complete search history.

(56) References Cited

U.S. PATENT DOCUMENTS 4,873,044 A 10/1989 Epel
5,857,358 A 1/1999 De Vries, Jr. et al.
(Continued)

FOREIGN PATENT DOCUMENTS

CN 102049858 A 5/2011
CN 105034138 A 11/2015
(Continued)

OTHER PUBLICATIONS

Machine translation JPH10329219A (Year: 1998).*
(Continued)

*Primary Examiner* — Jacob T Minskey
*Assistant Examiner* — Ayne K. Swier
(74) *Attorney, Agent, or Firm* — Venable LLP

(57) ABSTRACT

A three dimensional manufactured product is manufactured A speed of filing an uncured light curing resin in a space for a next layer is enhanced, to improve a manufacturing speed. One surface of a container housing a light curing resin is configured by a gas-permeable sheet that faces the light curing resin, and transmits irradiation light of a light irradiating apparatus, and a light transmitting plate disposed at an outer side of the container from the gas permeable member. A pressurizing chamber controllable in pressure by a pressure controlling apparatus is defined between the gas-permeable sheet and the light transmitting plate. At moving a manufacturing stage, an inside of the pressurizing chamber is de-pressurized to cause the gas-permeable sheet to perform concave surface deformation, and at a time of (Continued)

performing light irradiation, gas in the pressurizing chamber is caused to permeate into the light curing resin by pressurizing.

20 Claims, 8 Drawing Sheets

(51) Int. Cl.
| | | |
|---|---|---|
| *B29C 64/255* | (2017.01) | |
| *B29C 64/264* | (2017.01) | |
| *B29C 64/364* | (2017.01) | |
| *B33Y 10/00* | (2015.01) | |
| *B33Y 30/00* | (2015.01) | |
| *C09D 4/00* | (2006.01) | |

(52) U.S. Cl.
CPC .......... *B29C 64/264* (2017.08); *B29C 64/364* (2017.08); *B33Y 10/00* (2014.12); *B33Y 30/00* (2014.12); *C09D 4/00* (2013.01)

(56) References Cited

U.S. PATENT DOCUMENTS

| | | | | |
|---|---|---|---|---|
| 5,965,629 | A * | 10/1999 | Jung | .................. C04B 41/0027 |
| | | | | 522/2 |
| 6,716,513 | B1 * | 4/2004 | Hasuo | .................. C04B 41/009 |
| | | | | 428/323 |
| 7,195,472 | B2 | 3/2007 | John | |
| 7,438,846 | B2 | 10/2008 | John | |
| 8,540,501 | B2 | 9/2013 | Yasukochi | |
| 9,216,546 | B2 | 12/2015 | Desimone et al. | |
| 2008/0001332 | A1 * | 1/2008 | Kim | ................... B29C 33/3857 |
| | | | | 264/225 |
| 2009/0309267 | A1 * | 12/2009 | Boot | .................... B29C 64/135 |
| | | | | 425/117 |
| 2010/0092765 | A1 * | 4/2010 | Hager | .................. C09C 1/0009 |
| | | | | 977/773 |
| 2012/0195994 | A1 * | 8/2012 | El-Siblani | ............. B29C 64/357 |
| | | | | 15/320 |
| 2014/0277568 | A1 * | 9/2014 | Baehre | .................... A61L 31/10 |
| | | | | 424/423 |
| 2015/0054198 | A1 | 2/2015 | Zenere | |
| 2015/0072293 | A1 | 3/2015 | Desimone et al. | |
| 2015/0231828 | A1 | 8/2015 | El-Siblani et al. | |
| 2016/0200052 | A1 | 7/2016 | Moore et al. | |
| 2018/0065302 | A1 | 3/2018 | Arai et al. | |

FOREIGN PATENT DOCUMENTS

| | | | | |
|---|---|---|---|---|
| JP | 5-96632 | A | 4/1993 | |
| JP | 5-503257 | A | 6/1993 | |
| JP | 6-246838 | A | 9/1994 | |
| JP | 10329219 | A * | 12/1998 | ............. B29C 67/00 |
| JP | 2001-047521 | A | 2/2001 | |
| JP | 2002-370286 | A | 12/2002 | |
| WO | 92/07705 | A1 | 5/1992 | |
| WO | WO-2016010189 | A1 * | 1/2016 | ............. B29C 67/00 |

OTHER PUBLICATIONS

Machine translation WO201610189A1 (Year: 2016).*
Fluorocarbon Group UK Jun. 2016: What is Perfluoroalkoxy polymer (PFA)? https://fluorocarbon.co.uk/news-and-events/post/15/what-is-perluoroalkoxy-polymer-pfa. (Year: 2016).*
First Office Action in Chinese Application No. 201710709428.7 (dated Oct. 8, 2019).
Non-Final Office Action in U.S. Appl. No. 15/681,760 (dated Apr. 27, 2020).
Notice of Preliminary Rejection in Korean Application No. 10-2017-0102078 (dated Apr. 24, 2020).
Second Office Action in Chinese Application No. 201710709428.7 (dated Jun. 10, 2020).
Notification of Reasons for Refusal in Japanese Application No. 2016-164835 (dated Aug. 2020).
Third Office Action in Chinese Application No. 201710709428.7 (dated Nov. 25, 2020).

* cited by examiner

THREE DIMENSIONAL MANUFACTURING APPARATUS AND METHOD FOR MANUFACTURING THREE DIMENSIONAL MANUFACTURED PRODUCT

CROSS-REFERENCE TO RELATED APPLICATIONS

This application is a divisional application of U.S. patent application Ser. No. 15/677,160, filed Aug. 15, 2017, which claims the benefit of Japanese Patent Application No. 2016-164835, filed Aug. 25, 2016, and Japanese Patent Application No. 2016-163070, filed Aug. 23, 2016. All of these prior applications are hereby incorporated by reference herein in their entirety.

BACKGROUND OF THE INVENTION

Field of the Invention

The present invention relates to a three dimensional manufacturing apparatus that performs light irradiation to a light curing resin housed in a container and manufactures a three dimensional manufactured product and a method for manufacturing a three dimensional manufactured product.

Description of the Related Art

In recent years, the three dimensional manufacturing technology has been developed, which forms a manufactured product by repeating the process steps of exposing a light curing resin in an uncured state and solidifying (curing) the light curing resin. In the three dimensional manufacturing apparatus of this type, there is known a configuration in which the light curing resin as a material is applied in a layer by layer manner onto a manufacturing stage or a solidified manufactured product (work) with a coating roller or the like, and light irradiation is repeated. Further, there is also known a configuration in which a manufacturing stage (or a manufactured part of a manufactured product) is immersed into a light curing resin housed in a container, layer manufacturing is performed by performing light irradiation from below or above, and the manufacturing stage is moved upward or downward to manufacture the next layer.

For example, the latter configuration has the advantage that the mechanical configuration and control of the manufacturing apparatus are simple because of using no coating mechanism as in the former configuration, but has the problem that the manufacturing speed in the additive direction is low (U. S. Patent Application Laid-Open No. 2015/54198). One of the factors that reduce the manufacturing speed is the problem that sticking (or viscosity increase) of the light curing resin occurs to the container of a resin, for example, a site of the light transmitting member that transmits curing light depending on the manufacturing conditions. In this case, the process step of forcefully removing the site where sticking or viscosity increase occurs is required when the stage is lifted or lowered for the next layer after one layer is manufactured, for example, and for this reason, the manufacturing speed is decreased. Further, there is also the problem that the moving apparatus of the manufacturing stage requires a large driving force. Further, another factor that reduces the manufacturing speed is the problem that the light curing resin is not supplied quickly to the space where the next manufactured layer is formed when the manufacturing stage is moved after manufacturing one layer, which also depends on the manufacturing conditions.

Thus, there has been proposed a method of forming a state that inhibits curing (polymerization) of a light curing resin in the specific site of a container, for example, a spatial region in the vicinity of a light transmitting member that transmits curing light (U.S. Pat. No. 9,216,546). In the configuration, the light transmitting member facing the light curing resin in the container is formed of a gas permeable member, for example, and gas (gas including atoms of oxygen, for example) that inhibits curing (polymerization) of the light curing resin is caused to permeate into the light curing resin from outside of the gas permeable member. According to the configuration, the gas permeating through the gas permeable member inhibits curing (polymerization) of the light curing resin in the space in the vicinity of the light transmitting member. Accordingly, sticking to the light transmitting member, reduction in stage moving speed, and reduction in supply speed of a molten resin for the next layer are suppressed. There is the possibility of enabling a continuous and high-speed additive manufacturing operation by, for example, irradiating curing light as a moving image and continuously moving the stage by the configuration like this.

Here, in the manufacturing method that repeats light curing of the light curing resin and movement of the manufacturing stage, the relationship between various manufacturing conditions and the manufacturing speed is considered.

For example, when solidified layers are continuously added by continuously irradiating exposed images by the method like moving image irradiation, the thickness of the solidified layer becomes about 0.02 mm to 0.2 mm, which is very thin. Subsequently, the stage is moved by an amount corresponding to the thickness of the above described solidified layer at each irradiation of one frame (corresponding to one manufactured layer, for example). By stage moving, a resin is supplied to the space where the density is reduced in a gap from the vicinity of the transmitting section of the container, for example, and it takes much time to supply an uncured light curing resin to the narrow (thin) space like this.

Thus, in order to increase the supply speed of the light curing resin, devices are taken to reduce the sectional areas in the respective layers of the manufactured product, and manufacture the manufactured product by dividing the manufactured product into a plurality of blocks. Further, measures such as using a material with low viscosity for the light curing resin may be taken. When the manufactured layer is made small or divided into small pieces like a lattice structure, for example, in order to decrease the sectional areas in the respective layers of the manufactured product, there arises the problem that the strength of the manufactured product decreases. Initially, the structure like the lattice form may not always match the structure of a desired manufactured product which is desired to be manufactured, in some cases.

Further, when the material with low viscosity is used for the light curing resin, there is the possibility of occurrence of the problem that shrinkage at the time of solidification becomes large and deformation of the manufactured product occurs, and the problem that the degree of polymerization at the time of light curing does not increase to cause reduction in strength, and decrease heat resistance.

Thus, in order to advance material supply to the solidified layer by using the material with low viscosity, the methods are also considered, which rapidly executes a manufacturing phase that performs light curing by moving image projection or the like, and executes a post cure method as a post processing step after the manufacturing phase. In the post cure method, the process step of curing an uncured part by adding light and heat is performed, in order to increase strength of the resin. However, when secondary curing is performed by post cure, the problems such as dimensional change and deformation at the time of curing are likely to occur.

Dividing the manufactured product (solidified layer) into small pieces, and reducing the viscosity of the light curing resin, with the supply speed of the light curing resin taken into consideration, cannot be said as essential solutions, and have the problem of causing various other unfavorable side effects. Consequently, when solid manufacturing with less lightening hole portion is performed without decreasing the viscosity of the light curing resin uselessly, the time period has conventionally tended to increase, in which the uncured material is precisely filled into the narrow space for the next layer after the stage is moved.

Even by the method that causes the curing inhibiting gas to permeate as in U.S. Pat. No. 9,216,546 described above, it is not so easy to shorten the time period in which the material is filled into the space for the next layer of the thickness of 25 to 35 µm, for example, with the resin with high viscosity, and in the manufactured product in the shape with a large irradiation (curing) area of one layer.

SUMMARY OF THE INVENTION

In the light of the above described problems, an object of the present invention is to increase a speed at which an uncured light curing resin is filled into a space for a next layer in a three dimensional manufacturing that repeats light curing of a light curing resin and moving of a manufacturing stage. Further, an object of the present invention is to suppress solidification, sticking and reduction in viscosity of the light curing resin in a vicinity of a transmitting section for curing light (manufacturing light), for example, by using gas having a curing inhibiting property.

In order to solve the above described problems, according to an aspect of the present invention, a three dimensional manufacturing apparatus, comprises: a container that includes a gas permeable member disposed to be in contact with a light curing resin, and a light transmitting member disposed at an opposite side to the light curing resin, of the gas permeable member, and houses the light curing resin; a light irradiating apparatus that performs light irradiation to the light curing resin housed in the container; a moving apparatus that moves a site cured by light irradiation by the light irradiating apparatus in a direction to separate from the gas permeable member; a pressurizing chamber that is defined by the gas permeable member and the light transmitting member; a pressure controlling apparatus that controls pressure of gas inside the pressurizing chamber; and a controlling unit that controls the light irradiating apparatus, the moving apparatus and the pressure controlling apparatus.

According to another aspect of the present invention, a method for manufacturing a three dimensional manufactured product, comprises: irradiating light to a light curing resin that is housed in a container including a gas permeable member disposed to be in contact with the light curing resin, and a light transmitting member disposed at an opposite side to the light curing resin, of the gas permeable member, and injecting gas to between the gas permeable member and the light transmitting member to cure the light curing resin; and moving the cured light curing resin in a direction to separate from the gas permeable member and de-pressurizing the gas between the gas permeable member and the light transmitting member.

According to the above described configuration, for example, at the time of moving the manufacturing stage, after light irradiation, the gas permeable member is deformed in the direction to separate from the manufactured site to enlarge the capacity of the manufacturing region, by de-pressurizing the pressurizing chamber. Thereby, the speed at which the uncured light curing resin is filled in the space for the next layer can be enhanced. Further, for example, when moving of the manufactured site is ended, and light irradiation is performed, the gas having a curing inhibiting property inside the pressurizing chamber is pressurized, and thereby the gas is caused to permeate into the light curing resin through the gas permeable member. Thereby, solidification, sticking and reduction in viscosity of the light curing resin in the vicinity of the light transmitting member, for example, are suppressed, whereby enhancement of the filling speed of the light curing resin after irradiation can be expected, and the manufacturing stage can be smoothly moved. In the above manner, the three dimensional manufacturing speed can be greatly enhanced.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereunder, modes for carrying out the present invention will be described with reference to embodiments illustrated in the accompanying drawings. The embodiments shown as follows are only examples, and, for example, the configurations of details can be arbitrarily changed by a person skilled in the art within the range without departing from the gist of the present invention. Further, the numerical values taken up in the present embodiments are reference numerical values, and do not intend to limit the present invention.

Embodiment 1

Figure 1:
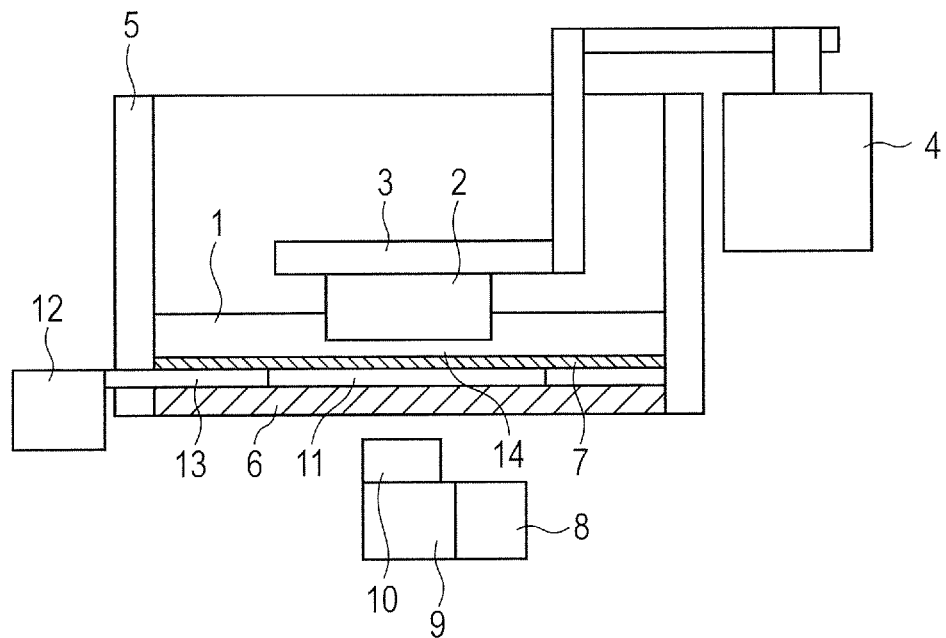
FIG. 1 is an explanatory view illustrating a configuration of a three dimensional manufacturing apparatus according to embodiment 1 of the present invention.

FIG. 1 illustrates a configuration of a three dimensional manufacturing apparatus for manufacturing a three dimensional manufactured product as a sectional structure, in embodiment 1. In FIG. 1, a light curing resin 1 in a molten (uncured) state is housed in a container 5. In the present description, a liquid light curing resin in a molten (uncured) state is described as a light curing resin.

As the light curing resin 1, a well-known light curing resin can be used. The light curing resin can include a monomer or an oligomer, a photopolymerization initiator, and various additives (a stabilizer, a filler, a pigment and the like). Further, both a monomer and an oligomer may be included. Monomers are organic materials that are polymerized into large molecules to form plastics. Oligomers are obtained by reacting some of monomers in advance and are materials that are polymerized into large molecules to form plastics similarly to monomers. A light polymerization initiator absorbs light to be activated (excited) and generates substances that initiate reaction such as radical molecules and hydrogen ions. The generated radical molecules, hydrogen ions and the like attack the oligomers and monomers to cause polymerization and crosslinking reaction. The portion irradiated with light changes from a liquid state to a solid state. Various additives such as a stabilizer and a filler may be added into a light curing resin composition in accordance with necessity for the purpose of stabilization, reinforcement and the like.

As the monomer and oligomer, there are cited an acrylic resin, a methacrylic resin, an acryl amide, an styrene resin, an olefin, a halogenated olefin, a cyclic alkene, a maleic anhydride, an alkene, an alkyne, a carbon monoxide, a functional oligomer, a polyfunctional curing site monomer, a functional PEG and the like, and combinations of these substances, but the monomer or oligomer is not limited to these substances and combinations. As the photopolymerization initiator, there are cited a benzoin isopropyl ether, a benzophenone, Michier's ketone, a Chlorothioxanthone, an isopropylthioxanthone, a benzyl dimethyl ketal, an acetophenone diethyl ketal, α-hydroxycyclohexyl phenyl ketone, a 2-hydroxy-2-methyl-phenylpropane and the like, and combinations of these substances, but the photopolymerization initiator is not limited to these substances and combinations. For example, the radical polymerization resin material is an acrylate material. Especially in that case, as the oligomer, the material of the light curing resin 1 is selected from an oligomer of urethane acrylate, epoxy acrylate, polyester acrylate, acryl acrylate and the like.

In the present embodiment, from a state in which a manufacturing stage 3 (a base plate) is immersed in (or at least in contact with) the light curing resin 1, light irradiation is performed from a direction of a bottom portion of the container 5, and one layer is manufactured. Thereafter, the manufacturing stage 3 is moved to an upper part in the drawing by a lifting/lowering apparatus 4 to manufacture the next layer, and after the light curing resin 1 is supplied to a lower part of a manufactured product generated on an undersurface of the manufacturing stage 3, light irradiation for manufacturing the next layer is performed.

While detailed illustration of the lifting/lowering apparatus 4 is omitted in FIG. 1, the lifting/lowering apparatus 4 can include a rotary drive source such as a motor, and a transfer (or transmission) system such as a rack and pinion. The lifting/lowering apparatus 4 can move the manufacturing stage 3 to an arbitrary height along a vertical direction in FIG. 1 based on control by a controlling apparatus (for example, a CPU 601) described later.

In the present embodiment, light irradiation for curing the light curing resin 1 is performed from a direction of a bottom section of the container 5, so that the bottom section of the container 5 is formed from a light transmitting material. Further, a side wall portion of the container 5 can be also formed from a light transmitting material for the purpose of visually recognizing (or photographing with a camera or the like not illustrated) progress of manufacturing. In particular, in the present embodiment, the bottom section of the container 5 includes a light transmitting plate 6 (light transmitting member) and a gas-permeable sheet 7 (gas permeable member) as described in detail later.

The curing light is irradiated from a light irradiating unit including a light source 8, a mirror unit 9 and a lens unit 10, for example. The light source 8 is a laser light source, for example. When the light curing resin 1 is of an ultraviolet curing type, for example, a wavelength of the irradiation light of the light source 8 is selected from a range of about 200 to 450 nm suitable for conditions such as the material of the light curing resin 1, for example. As a typical ultraviolet wavelength used for a purpose of resin curing of this type, 254 nm, 365 nm, 420 nm and the like are cited. However, the wavelength of the irradiation light of the light source 8 is not necessarily limited to an ultraviolet region, but irradiation light in another wavelength region may be used depending on the material of the light curing resin 1. The mirror unit 9 includes a galvanometer mirror unit or the like, and scans an irradiation spot of the light source 8 in an XY directions via the lens unit 10. Thereby, a site corresponding to a shape of one layer corresponding to a specific height of the manufactured product 2 of the light curing resin 1 can be cured.

The light irradiating unit may be configured as a projector that performs surface irradiation of a moving image depending on characteristics such as the material and viscosity of the light curing resin 1 without being limited to the light irradiation method by plane scanning of the laser spot as described above. However, in the case of a moving image projection method, measures such as using a frame rate to an extent that an operation of deforming the gas-permeable sheet 7 described later can follow are necessary. For example, when time required for deformation operation of the gas-permeable sheet 7 described later is 0.5 sec to 2.0 sec, frames of the moving image projected with the light source 8 adopts a frame projection interval corresponding to the time required for the deformation operation like this.

A space between the light transmitting section on the bottom section of the container 5 and an undersurface of a manufactured product 2 on a lower section of the manufacturing stage 3 corresponds to a manufacturing region 14 (manufacturing space) that cures the light curing resin 1 in sites corresponding to respective layers of the manufactured product 2 one after another while the manufacturing stage 3 is being moved upward.

In the present embodiment, the light transmitting section at the bottom section of the container 5 includes the light transmitting plate 6 that forms an outermost portion of the container 5, and the gas-permeable sheet 7 which faces the light curing resin 1 in the container 5, and is disposed substantially parallel with the light transmitting plate 6 to be separated by a predetermined distance from the light transmitting plate 6. The gas-permeable sheet 7 is a gas permeable member having a characteristic that allows gas including a curing (polymerization) inhibitor to permeate in a direction of the light curing resin 1 in the container 5. As a material for the gas-permeable sheet 7 like this, a material such as PFA, PTFE, PP or PE is conceivable. The gas-permeable sheet 7 specially needs to have a light transmitting property to light of an emission wavelength of the light source 8. In general, uncolored transparent materials of the materials as described above are used for the gas-permeable sheet 7.

Further, the gas-permeable sheet 7 is selected so as to be easily deformable by de-pressurizing control of a pressurizing chamber 11 described later. For example, in the case of the resins of the materials as described above, the thickness of the gas-permeable sheet 7 is considered to be about 1.0 mm to 10 mm.

Glass or a quartz plate is conceivable as the material of the light transmitting plate 6. In the present embodiment, the light transmitting plate 6 preferably has high rigidity, and therefore, a thickness of the light transmitting plate 6 is considered to be 10 mm to 30 mm.

Further, in the present embodiment, the light transmitting plate 6 and the gas-permeable sheet 7 which are disposed by being separated by the predetermined distance (for example, of an order of mm) define the pressurizing chamber 11 between both the light transmitting plate 6 and the gas-permeable sheet 7. Gas as the curing (polymerization) inhibitor is enabled to be supplied to an inside of the pressurizing chamber 11 by a pressure controlling apparatus 12. Further, the pressure controlling apparatus 12 is configured to be enabled to perform (pressurizing/de-pressurizing) control of the pressure of gas filled in the pressurizing chamber 11 in accordance with progress of a manufacturing process as described later.

The reason why the gas as the curing (polymerization) inhibitor is allowed to permeate through the light curing resin 1 inside the container 5 through the gas-permeable sheet 7 from the inside of the pressurizing chamber 11 is to suppress curing of the light curing resin 1 in the manufacturing region 14, in particular, in a lower region of the manufacturing region 14. This can avoid the problems that the light curing resin 1 sticks to the bottom section of the container 5, in particular, the gas-permeable sheet 7 to make movement of the manufactured product 2 difficult, and the light curing resin 1 for the next layer is not supplied smoothly.

As the gas which is filled into the pressurizing chamber 11, gas including oxygen, ozone, air, nitrogen, argon and the like is conceivable though it depends on the material of the light curing resin 1. For example, when the material of a radical polymerization type that is often used generally as the light curing resin 1 is used, the gas including oxygen as a single substance, such as oxygen or ozone, is conceivable. In this case, as the gas which is filled in the pressurizing chamber 11, pure oxygen, air in which an ozone concentration is increased by using ozone generated by an ozone generator or the like, and the like can be used in addition to air (atmosphere) and the like, for example.

If the gas which is filled in the pressurizing chamber 11 is air, the pressure controlling apparatus 12 can include a compressor and a vacuum pump for pressurizing and de-pressurizing, a control valve and the like (details not illustrated). In the case of using gas such as a pure oxygen, a tank or the like that stores and supplies the gas is further added to the pressure controlling apparatus 12. Further, in the case of using an ozone, the ozone generator or the like can be added to a gas flow path in the pressure controlling apparatus 12.

Figure 2:
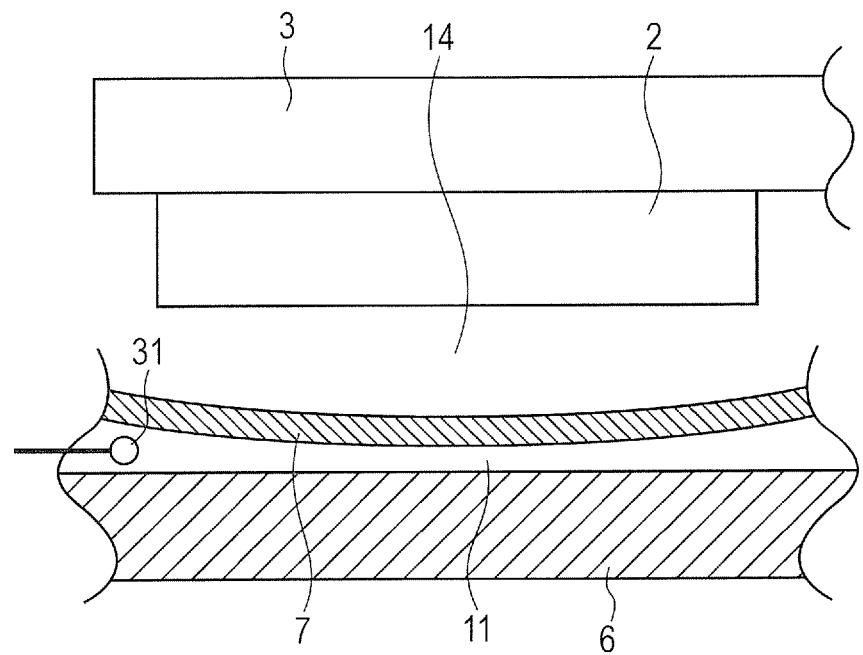
FIG. 2 is an explanatory view illustrating an essential part of the apparatus in FIG. 1 by enlarging the essential part.

As illustrated in FIG. 2, a pressure sensor 31 for measuring an internal pressure of the pressurizing chamber 11 can be disposed inside the pressurizing chamber 11. In pressurizing or de-pressurizing control by the pressure controlling apparatus 12 described later, the CPU 601 or a pressure controlling unit 606 can control the internal pressure of the pressurizing chamber 11 to a target pressure value by using a pressure measurement value outputted by the pressure sensor 31.

As illustrated in FIG. 1, a gas flow path 13 provides communication between the pressure controlling apparatus 12 and the pressurizing chamber 11, and the pressure controlling apparatus 12 controls the internal pressure of the pressurizing chamber 11 via the gas flow path 13. For example, in manufacturing control described later, at a time of irradiating curing light, the pressure controlling apparatus 12 preferably generates positive pressure of about 100 to 150 PSI (or around 10 atmospheric pressure), for example. This supplies the gas as a required amount of curing (polymerization) inhibitor to the site facing the gas-permeable sheet 7, of the manufacturing region 14 of the light curing resin 1, and suppresses unnecessary solidification, sticking and reduction in viscosity of the light curing resin in the vicinity of the light transmitting member, for example.

Further, in the present embodiment, the pressure controlling apparatus 12 controls the inside of the pressurizing chamber 11 to negative pressure, and deforms the gas-permeable sheet 7 in a direction to retreat and separate from the manufacturing region 14, or a manufactured site of the manufactured product 2, as illustrated in FIG. 2. The decompressing operation generates negative pressure in the light curing resin 1 in the manufacturing region 14 through the gas-permeable sheet 7, and can supply the light curing resin 1 to be the material for the next layer to the site having the negative pressure rapidly and smoothly from surroundings of the manufactured site of the manufactured product 2.

Figure 5:
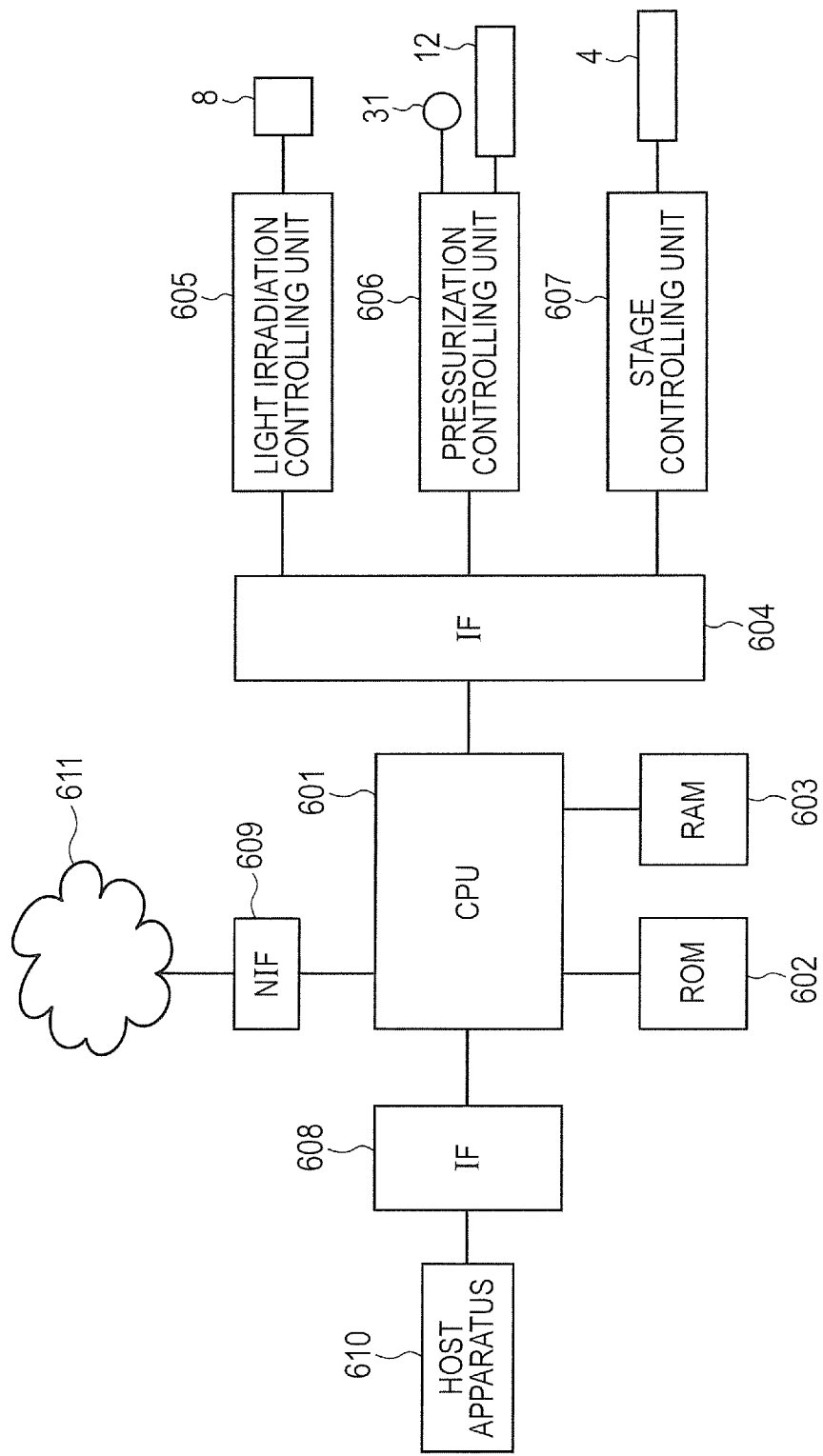
FIG. 5 is a block diagram illustrating a configuration example of a control system of the three dimensional manufacturing apparatus according to the present invention.

FIG. 5 illustrates a configuration of a control system of the manufacturing apparatus in FIG. 1 (the same applies to a configuration of embodiment 2 in FIG. 3 described later).

In the configuration in FIG. 5, a ROM 602, a RAM 603, interfaces 604 and 608, a network interface 609 and the like are disposed around the CPU 601 having charge of main functions of the controlling apparatus.

The ROM 602, the RAM 603 and the various interfaces 604, 608 and 609 are connected to the CPU 601. Basic programs such as BIOS are stored in the ROM 602. A device such as a rewritable E(E)PROM may be included in a storage region of the ROM 602. The RAM 603 is used as a work area that temporarily stores an arithmetic operation processing result of the CPU 601. The CPU 601 executes a manufacturing control procedure described later by executing a program recorded (stored) in the ROM 602.

When the program for executing the manufacturing control procedure described later is recorded (stored) in the ROM 602, a recording medium configures a computer readable recording medium storing the control procedure for carrying out the present invention. The program for executing the control procedure described later may be stored in a detachable computer readable recording medium such as various flash memories and optical (magnetic) disks, besides being stored in a fixed recording medium such as the ROM 602. The storing mode like this can be used when the program for executing the control procedure of carrying out the present invention is installed and updated. When the control program like this is installed and updated, a method of downloading the program from a network 611 via the network interface 609 can be used, besides using the detachable recording media as described above.

The CPU 601 can communicate with other resources on the network 611 that performs communication by using a protocol such as TCP/IP, for example, via the network interface 609. The network interface 609 can be configured by various network communication methods such as wired connection (IEEE802.3, etc.) and radio connection (IEEE802.xx, etc.), for example. Further, from a server disposed in the network 611, a manufacturing control program described later can be downloaded and installed in a program memory such as the ROM 602, or a program that is already installed can be updated to a new version.

Three dimensional (3D) data for three dimensionally manufacturing the manufactured product 2 additively is transmitted from an upper host apparatus 610 through the interface 608 in a data format such as 3D CAD, for example. The interface 608 can be configured based on various, for example, various serial or parallel interface standards. Further, the host apparatus 610 can similarly supply manufacturing data to the present manufacturing apparatus when the host apparatus 610 is connected to the network 611 as a network terminal.

The CPU 601 communicates with a light irradiation controlling unit 605 that controls the light source 8, a pressurization controlling unit 606 that receives a detection value of the pressure sensor 31 and controls the pressure controlling apparatus 12, and a stage controlling unit 607 that controls lifting and lowering of the lifting/lowering apparatus 4. The CPU 601 causes an entire manufacturing process to progress by controlling these respective units in accordance with a desired manufacturing sequence.

The interface 604 can be configured based on, for example, various serial or parallel interface standards. Although FIG. 5 illustrates the interface 604 as one block for simplification, the interface 604 may be configured by interface circuits respectively having different communication methods in accordance with communication specifications and the like of the respective units illustrated at a right side of the interface 604.

Figure 4:
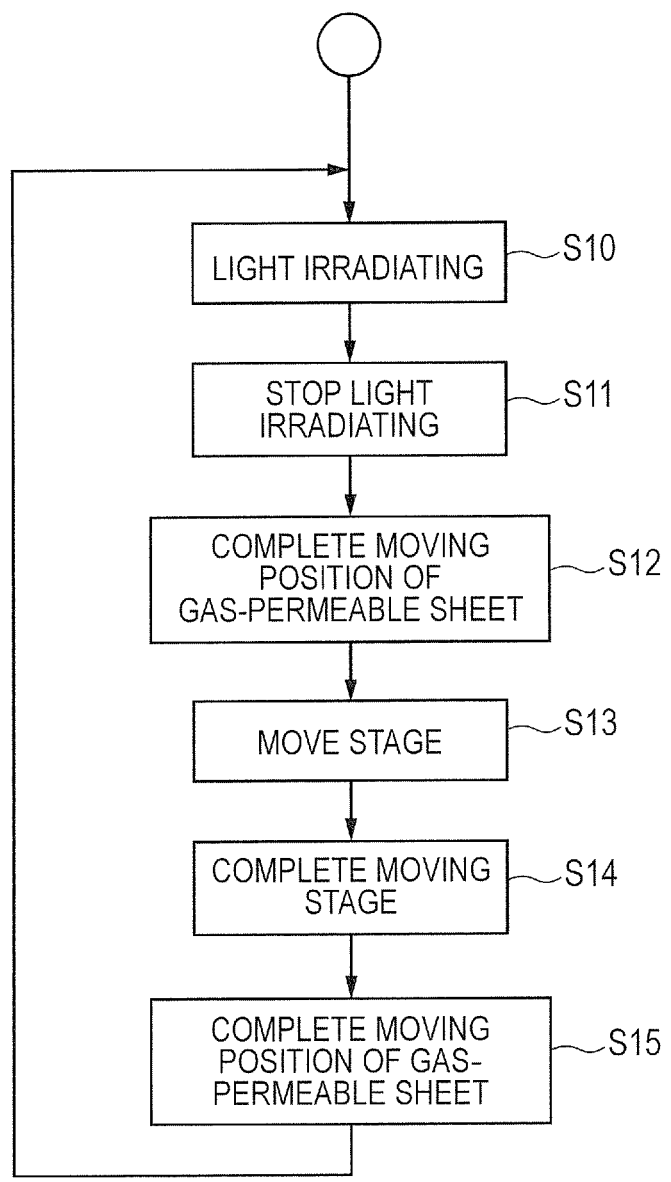
FIG. 4 is a flowchart illustrating a three dimensional manufacturing control procedure according to the present invention.

Next, an operation in the above described configuration will be described with reference to FIGS. 1, 2 and 4. FIG. 4 illustrates a manufacturing control procedure in the apparatus in FIG. 1. The procedure in FIG. 4 is described as a control program which is readable and executable by the CPU 601 (control apparatus: a computer), for example, and can be stored in the ROM 602 (or an external storage apparatus not illustrated), for example. A flow (S10 to S15) in a left column in FIG. 4 shows a main control procedure of the manufacturing control.

Prior to manufacturing, the light curing resin 1 in a liquid (uncured) state is supplied into the container 5. The procedure may be performed by a manual operation of a worker, or may be configured to be injected into the container 5 via a resin supplying apparatus not illustrated. In the configuration in which the light curing resin 1 is supplied by the resin supplying apparatus, automatic control that automatically controls an amount of the light curing resin 1 in the container 5 to an appropriate amount may be performed in accordance with an output from an appropriate liquid level detecting unit that detects a liquid surface level of the light curing resin 1. Further, when the resin supplying apparatus is disposed, a configuration may be adopted, in which a resin recovering apparatus that sucks and discharges the light curing resin 1 from the container 5 is added, and the light curing resin 1 is circulated to the resin supplying apparatus from the resin recovering apparatus, and further to the container 5 again.

Process steps illustrated as steps S10 to S15 in FIG. 4 correspond to the control procedure at a time of manufacturing one layer of the manufactured product 2. By executing steps S10 to S15 repeatedly, the manufactured product 2 can be additively manufactured.

Prior to step S10 in FIG. 4, the CPU 601 performs control of controlling the pressure controlling apparatus 12 and the pressure sensor 31 to pressurize gas inside the pressurizing chamber 11. Here, the CPU 601 controls gas supply by the pressure controlling apparatus 12 based on the internal pressure of the pressurizing chamber 11 that is detected by the pressure sensor 31. A target pressure inside the pressurizing chamber 11 by the pressurizing control is preferably considered as 100 to 150 PSI (around 10 atmospheric pressure), for example. When a pressure value detected by the pressure sensor 31 reaches the target pressure, the CPU 601 stops gas supply by the pressure controlling apparatus 12, closes a valve disposed upstream of the gas flow path 13 to complete the pressurizing control. Processing of completion of the pressurizing control corresponds to pressurizing completion processing relating to pressurizing control described later.

In step S10 in FIG. 4, the CPU 601 turns on the light source 8, and scans the irradiation light of the light source 8 by the mirror unit 9 in accordance with a shape of the manufactured layer. Thereby, curing light from the light source 8 passes through the light transmitting plate 6, the pressurizing chamber 11 and the gas-permeable sheet 7 from the mirror unit 9 and the lens unit 10 to be irradiated to the light curing resin 1 in the vicinity of the manufacturing region 14, and cures a site of the light curing resin 1 in the vicinity of the manufacturing region 14. The 3D shape date of the manufactured product 2 is transmitted in advance from the host apparatus 610 or the like, and shape date (slice data) of the respective layers is generated by converting the 3D manufacturing data into (sectional) shape data of a plurality of manufactured layers, for example. Alternatively, the shape data (slice data) of the respectively layers which is generated by converting the 3D shape data into (sectional) shape data of the plurality of manufactured layers, for example, is inputted to the CPU 601 from the host apparatus 610. In the present description, the 3D shape data or the shape data (slice data) of the respective layers are referred to as shape data.

During the light irradiation process step, (curing inhibiting) gas in the pressurizing chamber 11 is pressurized as described above, permeates (penetrates) into a lower part of the manufacturing region 14 through the gas-permeable sheet 7, and restrains the light curing resin 1 in a site of the lower part of the manufacturing region 14 from being cured, or generating unfavorable viscosity increase. In a pressurizing period for pressurizing the pressurizing chamber 11, control of enhancing the pressure inside the pressurizing chamber 11 and preventing deformation of the gas-permeable sheet 7 due to a resin load may be performed when an amount of the resin inside the container 5 is large. For example, when a liquid level detecting unit (not illustrated) that detects the liquid surface level of the light curing resin 1 is disposed, control of increasing and decreasing the internal pressure of the pressurizing chamber 11 is performed by the pressure controlling apparatus 12 in accordance with a detection value of the liquid level detecting unit.

When the irradiation light scanning that cures one manufactured layer is ended, the CPU 601 stops light irradiation of the light source 8 in step S11 (stop light irradiating). Thereafter, the CPU 601 actuates a de-pressurizing mechanism of the pressure controlling apparatus 12 to de-pressurize the inside of the pressurizing chamber 11 while monitoring the pressure detection value of the pressure sensor 31. In the present embodiment, the de-pressurizing is performed to deform the gas-permeable sheet 7 in the direction to separate from the manufacturing region 14, in particular, the manufactured site of the manufactured product 2 as illustrated in FIG. 2. Consequently, as the pressure inside the pressurizing chamber 11 at a time of the de-pressurizing, an appropriate value that is the atmospheric pressure or less, for example, is selected in accordance with the material, rigidity, a thickness and the like of the gas-permeable sheet 7. The pressure value inside the pressurizing chamber 11 at the time of the de-pressurizing can be obtained by performing an experiment that obtains a value of negative pressure at which the gas-permeable sheet 7 generates the desired concave surface deformation in a state where an appropriate amount of light curing resin 1 is housed in the container 5 in advance, for example. When the pressure value detected via the pressure sensor 31 becomes the predetermined negative value, the CPU 601 stops the de-pressurizing (sucking) mechanism of the pressure controlling apparatus 12 in step S12 (complete moving the position of the gas-permeable sheet).

Thereafter, in steps S13 and S14, the CPU 601 controls the lifting/lowering apparatus 4 to lift the manufacturing stage 3 by a height required for manufacturing of the next layer (move the stage and complete moving the stage). At this time, a distance by which the manufacturing stage 3 is moved (lifted) to manufacture the next layer is a relatively very small distance of about 15 μm to 0.1 mm, though the distance depends on the shape and manufacturing specifications of the manufactured product 2. Supply of the light curing resin 1 to a space that is generated by stage moving is performed by viscosity of the resin itself and the atmospheric pressure, and a self-weight and negative pressure accompanying the lifting. However, the space which the resin is to enter is small as described above, so that a force to enter of the resin is not so large. Consequently, in order to supply the light curing resin 1 in the molten state into the "thin" space like this from surroundings and the lower part of the space, a relatively long time of an order of 10 to several tens of seconds has been required conventionally.

In contrast with the above, in the present embodiment, during the moving control process steps (S13, S14) of the manufacturing stage 3, the gas-permeable sheet 7 is caused to perform concave surface deformation as in FIG. 2 by the above described de-pressurizing process steps. That is, the gas-permeable sheet 7 is deformed to the direction to separate from the manufacturing region 14, in particular, the manufactured site of the manufactured product 2. Thereby, for example, a substantial capacity of the manufacturing region 14 is enlarged during the moving control process steps (S13, S14) of the manufacturing stage 3. That is, the space under the manufacturing stage 3 or the manufactured site of the manufactured product 2 on the lower portion of the manufacturing stage 3 is enlarged, and pressure (or a density) of the light curing resin 1 in a site of the space decreases more than pressure (or a density) of the light curing resin 1 in other sites. Thereby, as the manufacturing stage 3 moves upward, the light curing resin 1 in the molten state for manufacturing the next layer can be smoothly and rapidly supplied to the manufacturing region 14, in particular, the space under the manufactured site of the manufactured product 2.

In the conventional configuration in which the control of causing the gas-permeable sheet 7 to perform concave surface deformation by de-pressurizing of the pressurizing chamber 11 is not performed, the resin for manufacturing the next layer is only supplied to the manufacturing region 14 by only moving (lifting) of the manufactured product 2, so that the resin supply speed as in the present embodiment cannot be expected. According to the present embodiment, the gas-permeable sheet 7 is caused to perform concave surface deformation by de-pressurizing of the pressurizing chamber 11 as described above, and the capacity of the manufacturing region 14 is enlarged, whereby the light curing resin 1 easily enters the manufacturing region 14, and the light curing resin 1 is supplied more smoothly and rapidly as compared with the conventional apparatus. The supply speed of the light curing resin 1 differs depending on the kind and viscosity of the resin to be used, the shape of (the undersurface of) the manufactured product 2 and the like, a speed of about 0.3 ml/sec to 30 ml/sec can be achieved by the de-pressurizing control of the present embodiment.

After the manufacturing stage 3 is moved (lifted in the case of the present embodiment) by the predetermined amount in step S14 (complete moving the stage), the CPU 601 executes pressurizing control process steps that pressurize the inside of the pressurizing chamber 11 by using the pressure controlling apparatus 12 and the pressure sensor 31. Control contents at this time are similar to what is described in the above described initial pressurizing, and the method for determining the target pressure is similar to what is described above. Thereby, moving of the position of the gas-permeable sheet 7 is completed (step S15), and the flow can loop to step S10 to shift to manufacturing of the next layer. The pressurizing pressure at this time is set at such an extent that can mainly suppress unnecessary sticking (or viscosity increase) in the container 5 through the gas-permeable sheet 7 from the pressurizing chamber 11. As the pressure value at this time, for example, around 10 atmospheric pressure described above is conceivable, for example, and at the same time, the pressure value at this time is selected to such an extent that can at least deform the gas-permeable sheet 7 into a shape that is raised more upward than the concave surface deformation state as in FIG. 2. Positive pressure value control like this is necessary to perform de-pressurizing at the time of moving the manufacturing stage 3 effectively by causing the gas-permeable sheet 7 to perform a so-called diaphragm operation as described above.

As above, according to the present embodiment 1, for example, at the time of moving the manufacturing stage 3 after light irradiation, the gas-permeable sheet 7 is deformed in the direction to separate from the stage or the manufactured site by de-pressurizing the pressurizing chamber 11 and the capacity of the manufacturing region 14 can be enlarged. Thereby, the speed at which the uncured light curing resin is filled in the space for the next layer can be enhanced. Further, for example, when moving of the manufacturing stage 3 (the manufactured site) is ended, and light irradiation is performed, the gas having a curing inhibiting property in the pressurizing chamber is pressurized, and thereby the gas can be caused to permeate into the light curing resin through the gas permeable member. Thereby, solidification, sticking and viscosity reduction of the light curing resin in the vicinity of, for example, the transmitting section for the curing light (manufacturing light) and the like is suppressed, whereby enhancement of the filling speed of the light curing resin after irradiation can be also expected, and the manufacturing stage can be smoothly moved. In the manner as above, according to the present embodiment 1, the required time for manufacturing control among the manufactured layers can be reduced, and the three dimensional manufacturing speed can be greatly enhanced.

Further, according to the present embodiment, the hardware configuration is adopted, in which the pressurizing chamber 11 is disposed on the undersurface of the gas-permeable sheet 7, and the internal pressure of the pressurizing chamber 11 is pressurized and de-pressurized by the pressure controlling apparatus 12. Consequently, gas permeability of the gas-permeable sheet 7 is efficiently exhibited during the pressurizing period, and there is provided the advantage of not requiring a large apparatus configuration in which the pressure of a large chamber that houses the entire apparatus is controlled to high pressure.

Embodiment 2

In embodiment 1, the configuration is illustrated, in which light irradiation for curing the light curing resin 1 is performed from below the container 5, and the manufacturing stage 3 is moved upward by the lifting/lowering apparatus 4 for each layer formation as illustrated in FIG. 1, FIG. 2 and the like. However, the direction of light irradiation for curing the light curing resin 1, and the moving direction of the manufacturing stage 3 are not necessarily limited to the directions as described above.

Figure 3:
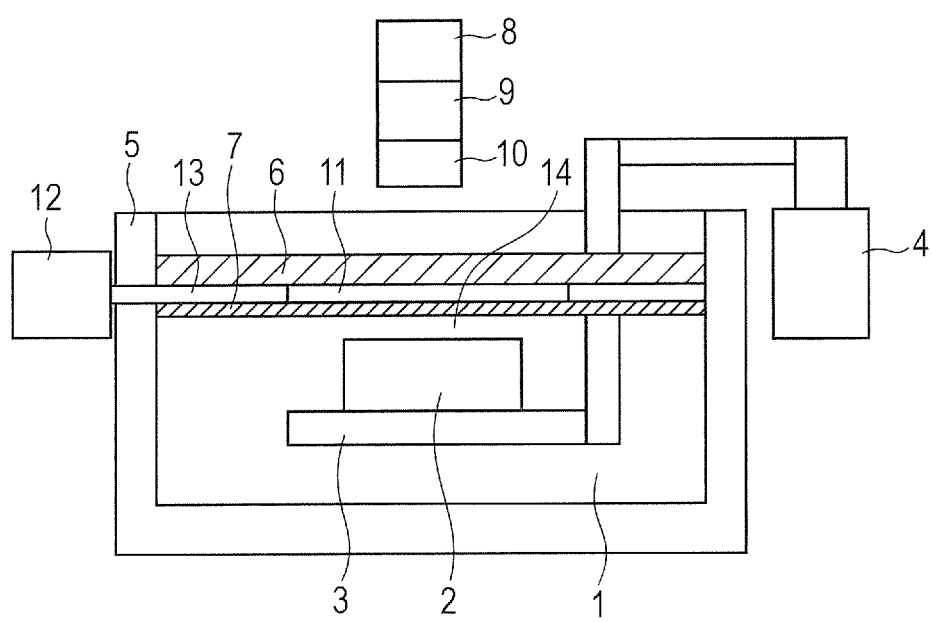
FIG. 3 is an explanatory view illustrating a configuration of a three dimensional manufacturing apparatus according to embodiment 2 of the present invention.

For example, as illustrated in FIG. 3, in a configuration in which light irradiation for curing the light curing resin 1 is performed from above the container 5, and the manufacturing stage 3 is moved downward by the lifting/lowering apparatus 4 for each layer formation, a configuration is conceivable, in which an equivalent operation and effect to the operation and effect of embodiment 1 are exhibited.

A manufacturing apparatus illustrated in FIG. 3 includes respective members assigned with the same reference signs as the members in FIGS. 1 and 2, and a difference from embodiment 1 concerning a manufacturing operation mainly lies in merely the light irradiation direction and the direction of moving of the manufacturing stage 3 that is performed for each layer manufacturing. The configuration in FIG. 3 may be considered as a configuration in which a top and a bottom are reversed exactly from the configuration in FIG. 1. In FIG. 3, the materials of the respective members assigned with the same reference signs as the members in FIGS. 1 and 2 are the same or equivalent to the members in embodiment 1.

In the configuration in FIG. 3, the gas-permeable sheet 7 and the light transmitting plate 6 are disposed to cover an upper portion of the container 5 filled with the light curing resin 1. The gas-permeable sheet 7 and the light transmitting plate 6 are disposed in order of the gas-permeable sheet 7 and the light transmitting plate 6 seen from a side of the light curing resin 1, and a space between the gas-permeable sheet 7 and the light transmitting plate 6 is the pressurizing chamber 11. A function of pressurizing and de-pressurizing the gas having a curing inhibiting property inside the pressurizing chamber 11 by the pressure controlling apparatus 12 through the gas flow path 13 is equivalent to the function in embodiment 1.

A control system of the manufacturing apparatus in FIG. 3 can be configured similarly to the control system in FIG. 5 of embodiment 1, and manufacturing control of the control system, and pressurizing and de-pressurizing control accompanying the manufacturing control can be executed by the CPU 601 substantially as shown in the flowchart in FIG. 4. However, it is needless to say that in that case, the statement of FIG. 4 in embodiment 1 needs to be rephrased in only one point that the moving direction of the manufacturing stage 3 after manufacturing one layer is "downward" instead of "upward" in embodiment 1.

In the configuration as in FIG. 3, in an irradiation period of curing light mainly from the light source 8, the inside of the pressurizing chamber 11 is pressurized, and the gas having a curing inhibiting property can be caused to permeate (penetrate) into the vicinity of the upper portion of the manufacturing region 14 in the upper portion of the container 5 through the gas-permeable sheet 7. Further, in the period of moving the manufacturing stage 3 after curing one layer, the inside of the pressurizing chamber 11 is de-pressurized, and the light curing resin 1 to be the material for the next layer can be supplied to the vicinity of the manufacturing region 14 rapidly and smoothly.

In the manner as above, in the configuration in which the irradiation direction of the curing light at the time of manufacturing, and the moving direction of the manufacturing stage accompanying progress of manufacturing are different from each other, the same configuration as in embodiment 1 described above can be realized, and a similar operation and effect to the operation and effect in embodiment 1 can be expected. When the irradiation direction of the curing light at the time of manufacturing and the moving direction of the manufacturing stage accompanying progress of manufacturing are different from the irradiation directions and the moving directions in both embodiment 1 and embodiment 2, the present invention can be carried out. It is needless to say that even in a configuration in which light irradiation is performed from a side of the container 5, and stage moving is performed to an opposite side, for example, a configuration can be carried out, in which a part of the container 5 is formed as the gas-permeable sheet, and the pressurizing chamber 11 is disposed on an outside of the gas permeable sheet.

Embodiment 3

Figure 6:
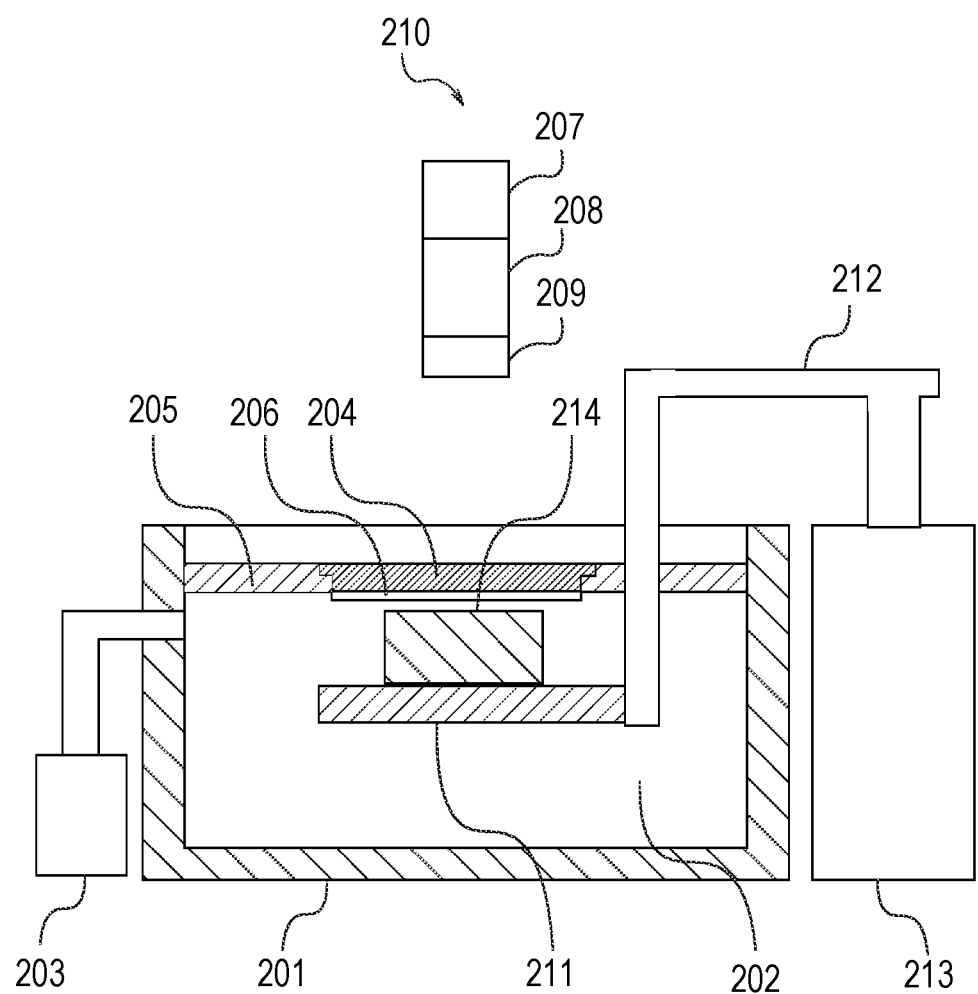
FIG. 6 is a sectional view of a first embodiment.

FIG. 6 is a view schematically illustrating a section of the apparatus to describe a structure of a three-dimensional manufacturing apparatus according to embodiment 3 of the present invention.

(Configuration of Apparatus)

In FIG. 6, reference sign 201 designates a container, reference sign 202 designates a light curing resin, reference sign 203 designates a resin supplying unit, reference sign 204 designates a light transmitting portion, reference sign 205 designates a light shielding portion, reference sign 206 designates a hydrophilic surface portion, reference sign 207 designates a light source, reference sign 208 designates a mirror unit, reference sign 209 designates a lens unit, reference sign 210 designates a light source unit, reference sign 211 designates a base, reference sign 212 designates a lifting/lowering arm, reference sign 213 designates a lifting/lowering unit, and reference sign 214 designates a three dimensional manufactured product.

The container 201 is a container for holding the light curing resin 202, and is formed from a material that shields light in a wavelength region that solidifies the light curing resin.

The resin supplying unit 203 includes a tank storing the light curing resin and a pump, and supplies the light curing resin so that a suitable amount of light curing resin 202 is held in the container 201.

The light curing resin 202 is a liquid resin that is cured (solidified) when the light curing resin 202 is irradiated with light in a specific wavelength region. As the light curing resin 202, a well-known light curing resin can be used. The light curing resin can include a monomer, a photopolymerization initiator, and various additives (a stabilizer, a filler, a pigment and the like). Further, an oligomer may be included in addition to a monomer. A monomer is an organic material that is polymerized into large molecules to form plastics. An oligomer is obtained by reacting some monomers in advance and is a material that is polymerized into a large molecule to form plastics similarly to a monomer. A light polymerization initiator absorbs light to be activated (excited) and generates substances that initiate reaction such as radical molecules and hydrogen ions. The generated radical molecules, hydrogen ions and the like attack the oligomers and monomers to cause polymerization and crosslinking reactions. The portion irradiated with light changes from a liquid state to a solid state. Various additives such as a stabilizer and a filler may be added into a light curing resin composition in accordance with necessity for the purpose of stabilization, reinforcement and the like.

As a monomer or oligomer, there are cited an acrylic resin, a methacrylic resin, an acryl amide, an styrene resin, an olefin, a halogenated olefin, a cyclic alkene, a maleic anhydride, an alkene, an alkyne, a carbon monoxide, a functional oligomer, a polyfunctional curing site monomer, a functional PEG and the like, and combinations of these substances, but the monomer or oligomer is not limited to these substances and combinations. As the photopolymerization initiator, there are cited a benzoin isopropyl ether, a benzophenone, Michier's ketone, a Chlorothioxanthone, an isopropylthioxanthone, a benzyl dimethyl ketal, an acetophenone diethyl ketal, α-hydroxycyclohexyl phenyl ketone, a 2-hydroxy-2-methyl-phenylpropane and the like, and combinations of these substances, but the photopolymerization initiator is not limited to these substances and combinations. For example, the radical polymerization resin material is an acrylate material. Especially in that case, as the oligomer, the material of the light curing resin 201 is selected from an oligomer of urethane acrylate, epoxy acrylate, polyester acrylate, acryl acrylate and the like. The light curing resin 202 is filled in the container 201 up to lower surfaces of the light transmitting portion 204 and the light shielding portion 205, and is held so that an air bubble does no enter the light curing resin 202. The light transmitting portion 204 and the light shielding portion 205 function as a lid of the container 201 and are openable and closable.

The light transmitting portion 204 is a window that transmits light in the wavelength region that solidifies the light curing resin 202, and is a glass plate, for example. The light shielding portion 205 is a portion formed of a member that shields the light in the wavelength region that solidifies the light curing resin 202. In the present embodiment, the light transmitting portion 204 is provided in a portion to be an optical path between the light source unit 210 and the base 211, of the portions functioning as the lid, and the light shielding portion 205 is formed in a region except for the light transmitting portion 204, but when unnecessary light does not enter from outside of the apparatus, the entire lid may be formed from the same material as the material of the light transmitting portion.

The UV light transmitting hydrophilic surface portion 206 described later is provided on a lower surface of the light transmitting portion 204. A hydrophilic surface refers to a surface state showing hydrophilicity if the surface is brought into contact with water. That is, the hydrophilic surface expresses a characteristic of the surface, but does not mean that the surface contacts water in a use state of the apparatus.

The light source 207, the mirror unit 208 and the lens unit 209 configure the light source unit 210 for irradiating the light curing resin with light corresponding to a shape of a three-dimensional model to be manufactured. The light source 207 is a light source that emits light in the wavelength region that solidifies the light curing resin. In the case of using a material having sensitivity to ultraviolet light as the light curing resin, an ultraviolet light source such as He—Cd laser and Ar laser is used. The mirror unit 208 is a unit that modulates the light emitted by the light source 207 in accordance with the shape of the three-dimensional model to be manufactured, a device in which micromirror devices are disposed in an array shape is used. The lens unit 209 is a lens for condensing the modulated light onto the light curing resin 202 located at a predetermined position under the light transmitting portion 204. The light curing resin 202 located in the predetermined position is cured when the light curing resin 202 is irradiated with condensed ultraviolet light with sufficient intensity.

In order to ensure precision of the shape of the cured object, it is desirable to set a focal position of the condensing lens at a vicinity of the light transmitting portion, but if the focal position is too close to the light transmitting portion, a cured resin is likely to be attached to the light transmitting portion 204. Thus, it is desirable to set the focal position of the lens unit 209, 60 μm to 110 μm below an undersurface of the light transmitting portion 204.

The light source unit 210 is not limited to the above described example as long as the light source unit 210 has a function of modulating the light in the wavelength region that solidifies the light curing resin in correspondence with the shape of the three-dimensional model to be manufactured, and condensing the light onto the predetermined position. For example, the light source unit 210 may be the unit using a combination of an ultraviolet light source and a liquid crystal shutter, a semiconductor laser diode array, a scanning mirror, an image forming mirror or the like.

The base 211 is a base that carries the three-dimensional manufactured product 214 on a top surface of the base 211 and supports the three-dimensional manufactured product 214, and is connected to the lifting/lowering unit 213 via the lifting/lowering arm 212. The lifting/lowering unit 213 is a mechanism that moves the lifting/lowering arm 212 up and down to adjust a height of the base 211, and is a moving unit that moves the base.

Figure 7:
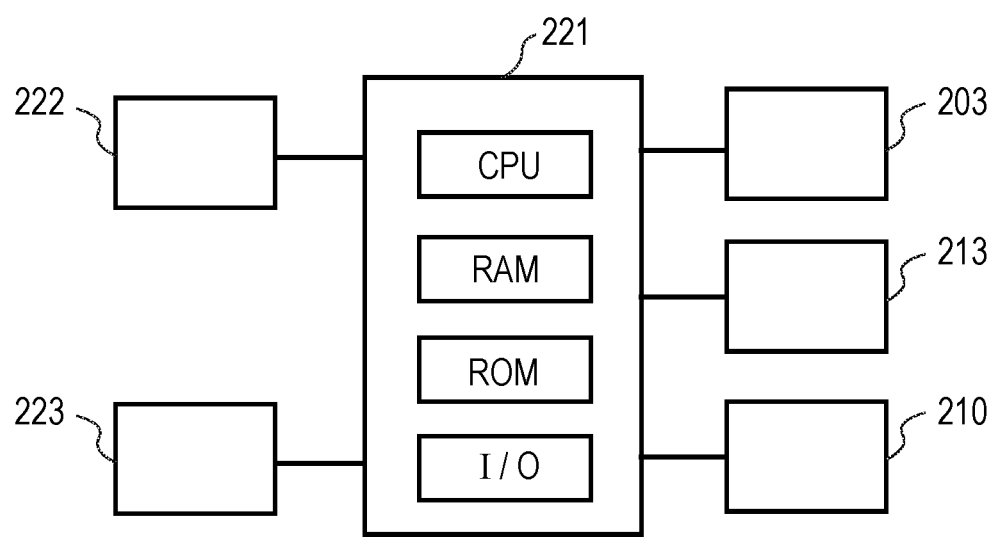
FIG. 7 is a block diagram of a first embodiment.

FIG. 7 is a block diagram of the three-dimensional manufacturing apparatus. Reference sign 221 designates a controlling unit, reference sign 222 designates an external apparatus, reference sign 223 designates an operation panel, reference sign 203 designates the resin supplying unit, reference sign 210 designates the light source unit, and reference sign 213 designates the lifting/lowering unit.

The controlling unit 221 includes a CPU, a ROM that is a nonvolatile memory storing control programs and controlling numerical value tables, a RAM that is a volatile memory for use in arithmetic operations and the like, an I/O port for communicating with respective units of the apparatus and the like. In the ROM, a program for controlling a basic operation of the three-dimensional manufacturing apparatus is stored. The controlling unit 21 may be a computer. In the case of recording (storing) the program for controlling the basic operation of the three-dimensional manufacturing apparatus in the ROM, the recording medium configures a computer readable recording medium that stores a control procedure for carrying out the present invention. The program for controlling the basic operation of the three-dimensional manufacturing apparatus may be stored in a detachable computer readable recording medium such as various flash memories and optical (magnetic) disks, besides being stored in a fixed recording medium such as the ROM. A storage form like this can be used when the program that causes the control procedure for carrying out the present invention to be executed is installed and updated. When the control program like this is installed or updated, a method of downloading the program from a network via a network interface can be used, besides using a detachable recording medium as described above.

From the external apparatus 222, shape data of the three-dimensional manufactured product is inputted to the controlling unit 221 of the three-dimensional manufacturing apparatus via the I/O port.

The operation panel 223 includes an input unit for an operator of the three-dimensional manufacturing apparatus to give an instruction to the apparatus, and a display unit for displaying information to the operator. The input unit includes a keyboard and operation buttons. The display unit includes a display panel displaying an operation situation and the like of the three-dimensional manufacturing apparatus.

The controlling unit 221 controls the resin supplying unit 203, the light source unit 210 and the lifting/lowering unit 213 to cause these units to execute a three-dimensional manufacturing process.

(Three-Dimensional Manufacturing Process)

Next, the three-dimensional manufacturing process using the above described three-dimensional manufacturing apparatus is described.

First, the controlling unit 221 confirms whether a predetermined amount of light curing resin is housed in the container 201 by using a sensor not illustrated. When the light curing resin is insufficient, the controlling unit 221 operates the resin supplying unit 203 to fill an inside of the container 201 with the predetermined amount of light curing resin 202.

Next, the controlling unit 221 operates the lifting/lowering unit 213 to set a position of the base 211 so that a height of the top surface of the base 211 is slightly below the focal position of the light source unit 210. For example, when a thickness of one layer at a time of forming the three-dimensional manufactured product by additive manufacturing is set as 40 μm, the position of the base 211 is adjusted so that the top surface of the base 211 is located 10 μm to 30 μm below the focal position.

The controlling unit 221 creates shape data (slice data) of respective layers that is used in an additive manufacturing process based on the three-dimensional manufactured model shape data inputted from the external apparatus 222. Alternatively, the shape data (slice data) of the respective layers, which is used in the additive manufacturing process and is created based on the three-dimensional manufactured model shape data is inputted to the controlling unit 221 from the external apparatus 222. In the present description, the three-dimensional manufactured model shape data or the shape data (slice data) of the respective layers is referred to as shape data.

Subsequently, the light source unit 210 is driven to emit light, and the light curing resin 202 is irradiated with ultraviolet light which is modulated based on the shape data of the first layer of the three-dimensional manufactured product. The light curing resin 202 at the irradiated site is cured, and the first layer portion of the three-dimensional manufactured product is formed on the base 11.

Next, as preparation for forming a second layer, the controlling unit 221 operates the lifting/lowering unit 213 to lower the base 211 on which the first layer portion is formed by 40 μm. The light curing resin 202 flows into a space between the base 211 which lowers and the light transmitting portion 204 from surroundings.

According to the present invention, hydrophilic surface treatment is applied to the undersurface of the light transmitting portion 204, that is, a surface in contact with the light curing resin 202, so that flow resistance of the light curing resin 202 is reduced. Consequently, an inflow speed of the light curing resin 202 is high, and it is possible to shorten time required for the preparation process step for forming the second layer. That is, at the time of manufacturing the three-dimensional manufactured product, the light source unit is caused to emit light to light-cure a part of the liquid light curing resin that is held in the container, and thereafter, the liquid light curing resin is replenished at a high speed while the liquid light curing resin is brought into contact with the hydrophilic surface provided on the light transmitting portion.

At a timing when inflow, namely, replenishment of the light curing resin 202 is completed, the controlling unit 221 drives the light source unit 210 and irradiates ultraviolet light modulated based on the shape data of the second layer of the three-dimensional manufactured product. The light curing resin 202 at the irradiated site is cured, and the second layer portion is additively formed on the first layer of the three-dimensional manufactured product.

Hereinafter, by repeating similar process steps, it is possible to add a large number of layers, and form the three-dimensional manufactured product in a desired shape.

According to the present invention, UV light transmitting hydrophilic treatment is applied to the undersurface of the light transmitting portion, and thereby, injection of the light curing resin for formation of the next layer can be performed at a high speed. Time required to form the three-dimensional manufactured product changes depending on the size and shape of the manufactured product, the kind of light curing resin which is used, the temperature and the like, so that it is difficult to express an effect of shortening time according to the present invention as a universal numerical value. Thus, relative comparison of the present invention and apparatus that do not carry out the present invention was performed.

Example 1

After a glass substrate surface was subjected to hydrophilic treatment by depositing a UV light transmitting hydrophilic film formed from calcium phosphate ceramics on a UV transmitting glass substrate, the glass substrate was used as the light transmitting portion 204.

As the hydrophilic treatment, it is possible to give a resin film having high affinity for the light curing resin in advance. Alternatively, an inorganic oxide film formed from microscopic inorganic oxides each having a diameter equal to or less than a visible light wavelength may be given, and an inorganic oxide film of, for example, a silicon oxide (silica SiOx), a titanium oxide, an aluminum oxide, a zinc oxide or the like may be given. In particular, the film formed from calcium phosphate ceramics has high transmittance to UV light and also has excellent durability, and therefore is a favorable material in carrying out the present invention.

First, the UV transmitting glass substrate cleaned in advance was set in a vacuum depositing apparatus, and was heated to 50 degrees centigrade. Then, a base layer of a thickness of 10 nm was deposited at a deposition rate of 2 angstroms/second. Next, while oxygen of $1.2\times10^{-2}$ Pa was introduced, a calcium phosphate electron gun was driven with total pressure at a degree of vacuum of $2\times10^{-3}$ Pa or less, and a calcium phosphate ceramics layer of a thickness of 100 nm was deposited at the deposition rate of 2 angstroms/second.

The ceramics layer can transmit UV light substantially without attenuating the UV light.

Comparative Example 1

Water-repellent coating of a fluorine coating material was applied to the surface of a UV transmitting glass substrate, and the glass substrate was used as the light transmitting portion 204.

Comparative Example 2

A UV transmitting glass substrate which surface was cleaned with an organic solvent and pure water was used as the light transmitting portion 204.

First, a liquid droplet shape examination was conducted in which a light curing resin was dropped onto the glass substrates of example 1, comparative example 1 and comparative example 2 and liquid droplet shapes were observed. The glass substrates had top and bottom surfaces reversed from those at the time of the glass substrates being set at the apparatus in FIG. 6 as the light transmitting portion 204, 100 microliters of urethane acrylate was dropped under the environment at 21.8 degrees centigrade, and the shapes were observed at the time point when the liquid droplets were stabilized on the substrates.

Figure 8A:
FIG. 8A illustrates a photograph of a liquid droplet experiment in example 1.
Figure 8B:
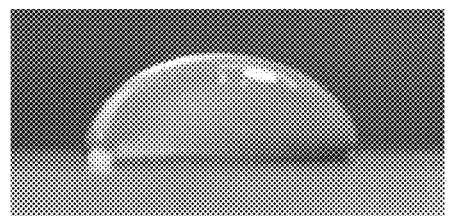
FIG. 8B illustrates a photograph of a liquid droplet experiment in comparative example 1.
Figure 8C:
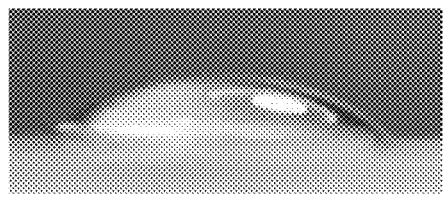
FIG. 8C illustrates a liquid droplet experiment in comparative example 2.

FIGS. 8A to 8C are respectively photographs of the experiment that was conducted to observe the liquid droplet shapes of example 1, comparative example 1 and comparative example 2 from the side. The shape measurement results of the liquid droplets are shown in Table 1.

TABLE 1

|  | EXAMPLE 1 | COMPARATIVE EXAMPLE 1 | COMPARATIVE EXAMPLE 2 |
| --- | --- | --- | --- |
| LIQUID DROPLET HEIGHT μm | 440 | 720 | 580 |
| LIQUID DROPLET DIAMETER mm | 17.1 | 13.3 | 14.8 |

In table 1, a liquid droplet height refers to a height from each of the glass substrate surfaces to a peak of each of the liquid droplets. Further, a liquid droplet diameter refers to a diameter of each of the liquid droplets at the time of each of the glass substrates being seen from above.

As is obvious from FIGS. 8A to 8C and Table 1, on the glass substrate in example 1, the liquid droplet of the light curing resin is flatter as compared with the liquid droplets on the glass substrates of comparative example 1 and comparative example 2. It can be said that as a result of coating the hydrophilic film formed from calcium phosphate ceramics, affinity between the substrate surface and the light curing resin is increased, and the liquid droplet shape becomes flat. That is, from the result and the like of the liquid droplet shape examination, it is found that the hydrophilic surface enables the liquid light curing resin to be replenished to between the light transmitting portion and the solid manufactured product quickly when the liquid droplet height in the liquid droplet shape examination is 550 μm or less and the liquid droplet diameter is 15.00 mm or more.

Next, the glass substrates in example 1, comparative example 1 and comparative example 2 were used as the light transmitting portion 204 of the three-dimensional manufacturing apparatus in FIG. 6, three-dimensional manufacturing was performed under the same conditions except for the point that the light transmitting portions were different, and time periods required for manufacturing were compared.

It has been confirmed that in the case of using the light transmitting portion in example 1, flow resistance of the light curing resin 202 is reduced as compared with flow resistance in example 1 and example 2 since the hydrophilic surface treatment was applied to the light transmitting portion in example 1, and the inflow speed of the light curing resin at the time of the base being lowered is about 15% to 20% higher. For example, in the case of forming a three-dimensional object having a bottom surface of 5 cm×5 cm, and a height of about 30 mm with the number of layers of 750, in example 1, the time period required for three-dimensional manufacturing including the light curing process was able to be reduced by approximately 60% compared with comparative example 1, and was able to be reduced by approximately 40% compared with comparative example 2.

Embodiment 4

Figure 9:
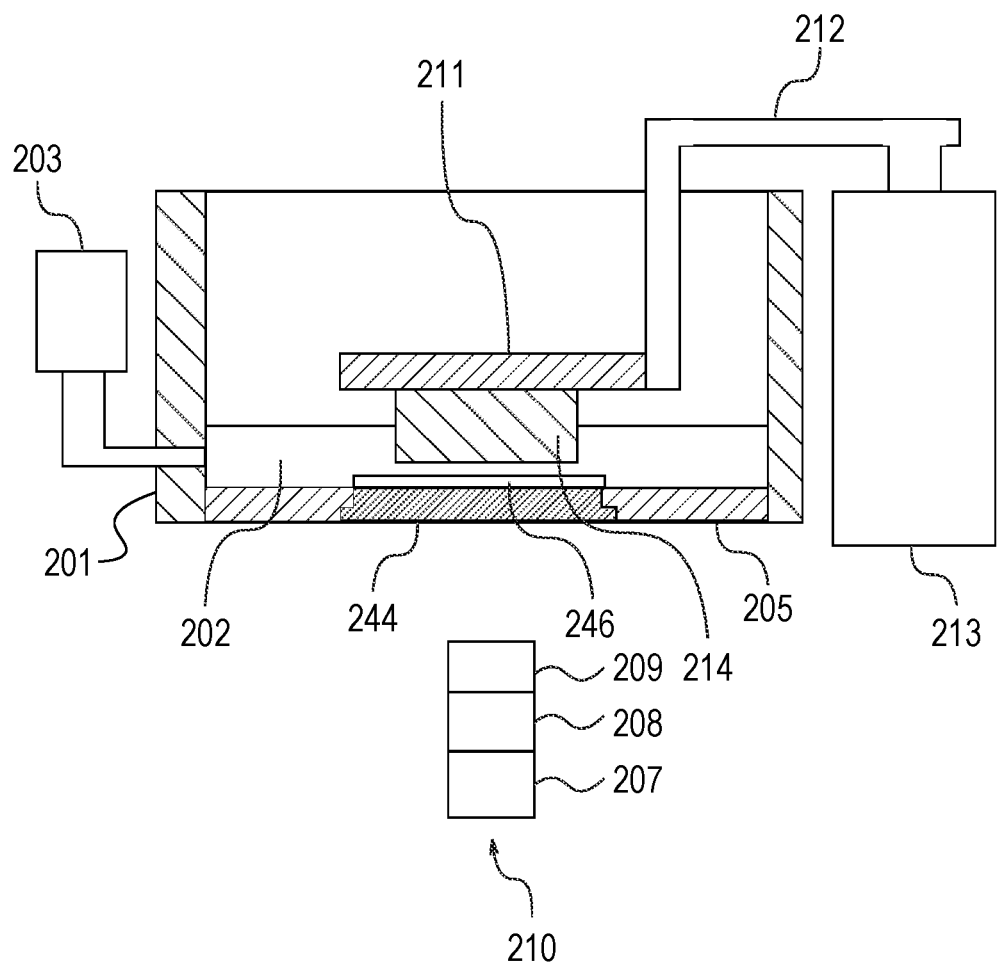
FIG. 9 is a sectional view of a second embodiment.

FIG. 9 is a view schematically illustrating a section of an apparatus for describing a structure of the three-dimensional manufacturing apparatus according to embodiment 4 of the present invention.

(Configuration of Apparatus)

In the first embodiment, the light transmitting portion functions as the lid of the container, but in the second embodiment, a light transmitting portion is provided on a bottom of the container. Further, the first embodiment and the second embodiment differ in that in the first embodiment, the material having high airtightness like the glass plate is used as the material of the light transmitting portion, whereas in the second embodiment, a material including a characteristic that transmits gas such as oxygen is used, for example, and gas is supplied to a light curing resin in a vicinity of the light transmitting portion through the light transmitting portion. When a radical polymerization material that is reduced in sensitivity to light curing when the material includes gas such as oxygen, for example, is used as the light curing resin, there is provided an advantage that a region where curing is inhibited is formed in the vicinity of the light transmitting portion, and an cured object does not adhere to the light transmitting portion.

In FIG. 9, reference sign 201 designates a container, reference sign 202 designates a light curing resin, reference sign 203 designates a resin supplying unit, reference sign 244 designates a light transmitting portion, reference sign 205 designates a light shielding portion, reference sign 246 designates a hydrophilic surface portion, reference sign 207 designates a light source, reference sign 208 designates a mirror unit, reference sign 209 designates a lens unit, reference sign 210 designates a light source unit, reference sign 211 designates a base, reference sign 212 designates a lifting/lowering arm, reference sign 213 designates a lifting/lowering unit, and reference sign 214 designates a three-dimensional manufactured product.

The container 201 is a container for holding the light curing resin 202, and is formed from a material that shields light in a wavelength region that solidifies the light curing resin.

The resin supplying unit 203 includes a tank storing the light curing resin and a pump, and supplies the light curing resin so that a suitable amount of light curing resin 202 is held in the container 201.

The light curing resin 202 is a liquid resin that is cured (solidified) when the light curing resin 202 is irradiated with light in a specific wavelength region.

The light transmitting portion 244 is a portion that transmits the light in the wavelength region that solidifies the light curing resin 202, and also allows gas which inhibits curing of the light curing resin to permeate through the light transmitting portion 244, and is configured by, for example, a plate of a material of a resin such as PFA, PTFE and PE.

The light curing resin in the vicinity of the light transmitting portion 244 is reduced in sensitivity to light curing by an action of curing inhibiting gas that permeates through the light transmitting portion 244. The gas exhibiting the curing inhibiting action is oxygen, for example, so that ordinary atmosphere may be present outside the light transmitting portion 244. In order to make the action of the gas more effective, a mechanism may be provided, that controls a composition and pressure of air outside the light transmitting portion.

The UV light transmitting hydrophilic surface portion 246 described later is provided on an upper surface of the light transmitting portion 244.

The light shielding portion 205 is a portion formed of a member that shields the light in the wavelength region that solidifies the light curing resin 202.

The light source 207, the mirror unit 208 and the lens unit 209 configure the light source unit 210 that irradiates the light curing resin with light corresponding to a shape of a three-dimensional model to be manufactured. The light source 207 is a light source that emits light in the wavelength region that solidifies the light curing resin. For example, in the case of using a material having sensitivity to ultraviolet light as the light curing resin, an ultraviolet light source such as a He—Cd laser and Ar laser is used. The mirror unit 208 is a unit that modulates the light emitted by the light source 207 in accordance with the shape of the three-dimensional model to be manufactured, and a device in which micromirror devices are disposed in an array shape is used. The lens unit 209 is a lens for condensing the modulated light to the light curing resin 202 located in a predetermined position under the light transmitting portion 244. The light curing resin 202 located at the predetermined position is cured by being irradiated with ultraviolet light with sufficient intensity.

In order to ensure precision of the shape of the cured object, it is desirable to set a focal position of the condensing lens at a vicinity of the light transmitting portion, but if the focal position is too close to the light transmitting portion, the focal position is likely to overlap a region where curing is inhibited by the gas. Thus, it is desirable to set the focal position of the lens unit 9, 60 μm to 110 μm above a top surface of the light transmitting portion 244.

The light source unit 210 is not limited to the above described example as long as the light source unit 10 has a function of modulating the light in the wavelength region that solidifies the light curing resin in accordance with the shape of the three-dimensional model to be manufactured, and condensing the light onto the predetermined position. For example, the light source unit 10 may use a combination of an ultraviolet light source and a liquid crystal shutter, a semiconductor laser diode array, a scanning mirror, an image forming mirror or the like.

The base 211 is a base that supports the three-dimensional manufactured product 214 by hanging the three-dimensional manufactured product 214 on an undersurface of the base 211, and is connected to the lifting/lowering unit 213 via the lifting/lowering arm 212. The lifting/lowering unit 213 is a mechanism that moves the lifting/lowering arm 212 up and down to adjust a height of the base 211, and is a moving unit that moves the base.

A block diagram of the three-dimensional manufacturing apparatus of the second embodiment is substantially common to FIG. 7 described in the first embodiment, and therefore explanation of the block diagram will be omitted.

(Three-Dimensional Manufacturing Process)

Next, a three-dimensional manufacturing process using the three-dimensional manufacturing apparatus in the second embodiment will be described.

First, the controlling unit 221 confirms whether a predetermined amount of light curing resin is housed in the container 201 by using a sensor not illustrated. When the light curing resin is insufficient, the controlling unit 221 operates the resin supplying unit 203 to fill an inside of the container 201 with the predetermined amount of light curing resin 202.

Next, the controlling unit 221 operates the lifting/lowering unit 213 to set a position of the base 211 so that a position of the undersurface of the base 211 is slightly above the focal point of the light source unit 210. For example, a thickness of one layer at the time of forming the three-dimensional manufactured product by additive manufacturing is set as 40 μm, the position of the base 211 is adjusted so that the undersurface of the base 211 is located 10 μm to 30 μm above the focal position.

The controlling unit 221 creates shape data (slice data) of respective layers that is used in an additive manufacturing process, based on the three-dimensional manufactured model shape data inputted from the external apparatus 222. Alternatively, the shape data (slice data) of the respective layers, which is used in the additive manufacturing process, and is created based on the three-dimensional manufactured model shape data is inputted to the controlling unit 221 from the external apparatus 222.

The controlling unit 221 drives the light source unit 210, and irradiates ultraviolet light modulated based on the shape data of the first layer of the three-dimensional manufactured product. The light curing resin 202 at the irradiated site is cured, and the first layer portion of the three-dimensional manufactured product is formed on the undersurface of the base 211.

Next, as preparation for forming a second layer, the controlling unit 221 operates the lifting/lowering unit 213 to lift the base 211 on which the first layer portion is formed by 40 μm. The light curing resin 202 flows into a space between the rising base 211 and the light transmitting portion 244 from surroundings.

According to the present invention, hydrophilic surface treatment is applied to the top surface of the light transmitting portion 244, that is, a surface in contact with the light curing resin 202, so that flow resistance of the light curing resin 202 is reduced. Consequently, an inflow speed of the light curing resin 202 is high, and it is possible to shorten time required for the preparation process step for forming the second layer.

At a timing when inflow of the light curing resin 202 is completed, the controlling unit 221 drives the light source unit 210 and irradiates ultraviolet light modulated based on the shape data, based on shape data of the second layer of the three-dimensional manufactured product. The light curing resin 202 at the irradiated site is cured, and the second layer portion is additively formed under the first layer of the three-dimensional manufactured product.

Hereinafter, by repeating similar process steps, it is possible to add a large number of layers, and form the three-dimensional manufactured product in a desired shape.

According to the present invention, hydrophilic treatment is applied to the top surface of the light transmitting portion, and thereby, injection of the light curing resin for formation of the next layer can be made at a high speed. Time required to form the three-dimensional manufactured product changes depending on the size and shape of the manufactured product, the kind of light curing resin which is used, the temperature and the like, so that it is difficult to express an effect of reduction in time according to the present invention as a universal numerical value. Thus, relative comparison with an apparatus that does not carry out the present invention was performed.

Example 2

A UV light transmitting hydrophilic film formed from calcium phosphate ceramics was deposited on a UV transmitting and gas permeable PFA substrate, hydrophilic treatment is applied to the surface, and thereafter the PFA substrate was used as the light transmitting portion 244.

First, the PFA substrate cleaned in advance was set in a vacuum depositing apparatus, and was heated to 50 degrees centigrade. Then, a base layer of a thickness of 10 nm was deposited at a deposition rate of 2 angstroms/second. Next, while oxygen of $1.2 \times 10^{-2}$ Pa was introduced, a calcium phosphate electron gun was driven with total pressure at a degree of vacuum of $2 \times 10^{-3}$ Pa or less, and a calcium phosphate ceramics layer of a thickness of 100 nm was deposited at the deposition rate of 2 angstroms/second.

The ceramics layer can transmit UV light substantially without attenuating the UV light, and also can allow gas such as oxygen and ozone to permeate through the ceramics layer.

Comparative Example 3

The surface of a UV transmitting and gas permeable PFA substrate was cleaned with an organic solvent and pure water, and the PFA substrate was used as the light transmitting portion 244.

First, a liquid droplet shape examination was conducted in which a light curing resin was dropped onto the PFA substrates of example 2, and comparative example 3, and liquid droplet shapes were observed. 100 microliters of urethane acrylate was dropped onto the hydrophilic surfaces on which the hydrophilic films were formed, of the PFA substrates, under the environment at 21.8 degrees centigrade, and the shapes of droplets were observed at the time point when the liquid droplets were stabilized on the substrates.

The shape measurement results of the liquid droplets are shown in Table 2.

TABLE 2

|  | EXAMPLE 2 | COMPARATIVE EXAMPLE 3 |
|---|---|---|
| LIQUID DROPLET HEIGHT μm | 435 | 620 |
| LIQUID DROPLET DIAMETER mm | 17.6 | 14.1 |

In table 2, a liquid droplet height refers to a height from each of the glass substrate surfaces to a peak of each of the liquid droplets. Further, a liquid droplet diameter refers to a diameter of each of the liquid droplets at the time of each of the PFE substrates being seen from above.

As is obvious from Table 2, on the PFE substrate in example 2, the liquid droplet of the light curing resin is flatter as compared with the liquid droplet on the PFE substrates of comparative example 3. It can be said that as a result of coating the hydrophilic film formed from calcium phosphate ceramics, affinity between the substrate surface and the light curing resin is increased, and the liquid droplet shape becomes flat.

Further, experiments were conducted on acryl acrylate, and polyester acrylate as the light curing resin 202, in addition to urethane acrylate, and it has been found that in both cases, liquid droplets are flattened more on the PFE substrate in example 2 than on the PFE substrate in comparative example 3.

The liquid droplet shapes observed on the PFE substrate in example 2 with respect to three kinds of light curing resins are shown in Table 3.

TABLE 3

| LIGHT CURING RESIN | URETHANE ACRYLATE | ACRYL ACRYLATE | POLYESTER ACRYLATE |
|---|---|---|---|
| LIQUID DROPLET HEIGHT μm | 435 | 420 | 520 |
| LIQUID DROPLET DIAMETER mm | 17.6 | 17.8 | 15.3 |

From the results of the liquid droplet shape examination and the like, it is found that the hydrophilic surface enables the liquid light curing resin to be supplied to between the light transmitting portion and the solid manufactured product quickly when the liquid droplet height in the liquid droplet shape examination is 550 μm or less and the liquid droplet diameter is 15.00 mm or more.

Next, the PFE substrates in example 2 and comparative example 3 were used as the light transmitting portion 244 of the three-dimensional manufacturing apparatus in FIG. 9, three-dimensional manufacturing was performed under the same conditions except that the light transmitting portions were different, and time periods required for manufacturing were compared.

It has been confirmed that in the case of using the light transmitting portion of example 2, flow resistance of the light curing resin 202 is reduced as compared with flow resistance in comparative example 3 since the hydrophilic surface treatment was applied to the light transmitting portion of example 2, and the inflow speed of the light curing resin at the time of the base being lifted is about 20% higher. As a result, in the case of forming a three-dimensional object having a bottom surface of 5 cm×5 cm, and a height of about 30 mm with the number of layers of 750, in example 2, the time period required for three-dimensional manufacturing including the light curing process was able to be shortened by approximately 55% compared with comparative example 3.

Other Embodiments

In the first embodiment, the light transmitting portion is disposed on the upper portion of the container, whereas in the second embodiment, the light transmitting portion is disposed on the bottom surface of the container. Disposition of the light transmitting portion to which hydrophilic surface treatment is applied of the present invention is not limited to these examples. For example, the light transmitting portion may be disposed on a side surface of the container, and light may be caused to be incident on a side of the container. In that case, the base may be moved in a lateral direction instead of the vertical direction to adjust the distance from the light transmitting portion.

In any of these dispositions, it is possible to use the member having high airtightness as in the first embodiment, or the member having gas permeability as in the second embodiment.

Further, in the first embodiment and the second embodiment, the light transmitting portions 204 and 244 are provided at portions to be optical paths between the light source units 210 and the bases 211, and hydrophilic surface treatment is applied to only the portions. However, hydrophilic surface treatment may be applied to a peripheral region of the portion to be the optical path.

The present invention is realizable by processing of supplying the program that realizes one or more functions of the aforementioned embodiments to a system or an apparatus via a network or a storage medium, and one or more processors in a computer in the system or the apparatus reading and executing the program. Further, the present invention is also realizable by a circuit (for example, ASIC) that realizes one of more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A three dimensional manufacturing apparatus comprising:
    a container configured to house a liquid light curing resin; and
    a light transmitting window being in contact with the liquid light curing resin,
    wherein the light transmitting window includes a gas permeable substrate and a surface in contact with the liquid light curing resin, and
    wherein the surface of the light transmitting window has increased affinity to the liquid light curing resin compared with a case where a glass substrate surface is in contact with the liquid light curing resin.

2. The three dimensional manufacturing apparatus according to claim 1, wherein the surface of the light transmitting window is formed from calcium phosphate ceramics.

3. The three dimensional manufacturing apparatus according to claim 1, wherein the surface of the light transmitting window is a hydrophilic surface.

4. The three dimensional manufacturing apparatus according to claim 1, wherein the light transmitting window includes a film disposed on the gas permeable substrate, and the film has the surface of the light transmitting window.

5. The three dimensional manufacturing apparatus according to claim 1, further comprising:
    a base unit configured to set a manufactured product that is the liquid light curing resin cured by light irradiation; and
    a moving unit configured to move the base unit.

6. The three dimensional manufacturing apparatus according to claim 1, further comprising a light irradiating unit configured to irradiate light to the liquid light curing resin, wherein the light cures the liquid light curing resin.

7. A method for manufacturing a three dimensional manufactured product using the three dimensional manufacturing apparatus according to claim 1, the method comprising irradiating the liquid light curing resin in the container with light to cure the liquid light curing resin, wherein the liquid light curing resin contains a radical polymerization resin material.

8. The method according to claim 7, wherein the liquid light curing resin in contact with the light transmitting window is provided with oxygen permeating through the light transmitting window.

9. A container configured to house a liquid light curing resin, the container comprising a light transmitting window including a gas permeable substrate and a surface in contact with the liquid light curing resin,
    wherein the surface of the light transmitting window has increased affinity to the liquid light curing resin compared with a case where a glass substrate surface is in contact with the liquid light curing resin.

10. The container according to claim 9, wherein the surface of the light transmitting window is formed from calcium phosphate ceramics.

11. The container according to claim 9, wherein the light transmitting window is a hydrophilic surface.

12. The container according to claim 9, wherein the light transmitting window includes a film disposed on the gas permeable substrate.

13. The three dimensional manufacturing apparatus according to claim 1, wherein the gas permeable substrate is configured by PFA, PTFE, or PE.

14. The three dimensional manufacturing apparatus according to claim 6, wherein the light is irradiated to the liquid light curing resin through the light transmitting window.

15. The three dimensional manufacturing apparatus according to claim 1, wherein the light transmitting window functions as a lid of the container.

16. The three dimensional manufacturing apparatus according to claim 1, wherein the light transmitting window functions as a bottom of the container.

17. The three dimensional manufacturing apparatus according to claim 6, wherein the light irradiating unit includes a lens unit.

18. A method for manufacturing a three dimensional manufactured product using the three dimensional manufacturing apparatus according to claim 17, the method comprising:
   setting a focal position of the lens unit in the liquid light curing resin and 60 μm to 110 μm apart from the hydrophilic surface of the light transmitting window; and
   irradiating the liquid light curing resin in the container with light to cure the liquid light curing resin.

19. A method for manufacturing a three dimensional manufactured product using the three dimensional manufacturing apparatus according to claim 17, the method comprising:
   adjusting a position of a base so that a surface of the base is located 10 μm to 30 μm apart from a focal position of the lens unit; and
   irradiating the liquid light curing resin in the container with light to cure the liquid light curing resin.

20. The method according to claim 7, wherein the liquid light curing resin contains acryl acrylate, polyester acrylate, or urethane acrylate.

\* \* \* \* \*